United States Patent Office 3,441,566
Patented Apr. 29, 1969

3,441,566
SUBSTITUTED QUINAZOLINES
William J. Houlihan, Mountain Lakes, N.J., assignor to Sandoz, Inc., Hanover, N.J.
No Drawing. Filed Nov. 9, 1964, Ser. No. 409,949
Int. Cl. C07d 57/12, 51/48; A61k 27/00
U.S. Cl. 260—251                                    10 Claims

ABSTRACT OF THE DISCLOSURE

Compounds of the formula

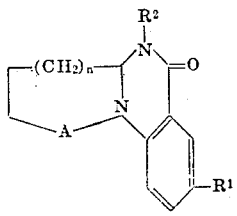

wherein $n=0$ or 1, A represents carbonyl or methylene, $R^1$ represents H or Cl, $R^2$ represents H or phenyl and $R^3$ represents lower alkyl, phenyl, p-fluorophenyl, p-chlorophenyl, p-straight chain (lower) alkoxy phenyl or 3,4-di (lower) straight chain alkyl phenyl. The compounds are used as antihypertensives.

---

The instant invention is directed to three classes of compounds of the formulae

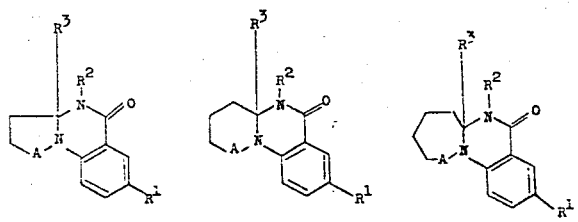

wherein
$R^1$ is either a hydrogen atom (—H); chlorine atom (—Cl); lower alkoxy, preferably with from 1 to 4 carbon atoms, e.g. methoxy, ethoxy, isopropoxy, propoxy and butoxy; trifluoromethyl (—CF$_3$); or lower alkyl, preferably having from 1 to 6 carbon atoms, e.g. methyl, ethyl, propyl, isopropyl, amyl and hexyl;
$R^2$ is either a hydrogen atom (—H); lower straight-chain alkyl, preferably having from 1 to 6 carbon atoms, e.g. methyl, ethyl, propyl, amyl and hexyl; aryl of the formula

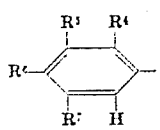

e.g. phenyl; aralkyl of the formula

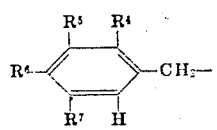

e.g. benzyl; or allyl;

$R^3$ is either lower alkyl, preferably having from 1 to 6 carbon atoms, e.g. methyl, propyl, isopropyl, amyl and hexyl; aryl as defined by Formula II; or aralkyl as defined by Formula III;

each of
$R^4$, $R^5$, $R^6$ and $R^7$ is either a hydrogen atom (—H), straight-chain lower alkyl, preferably having from 1 to 5 carbon atoms, e.g. methyl, ethyl, propyl, butyl and amyl; straight-chain lower alkoxy, preferably having from 1 to 4 carbon atoms, e.g. methoxy, ethoxy, propoxy and butoxy; a chlorine atom (—Cl); or a fluorine atom (—F); at most three of $R^4$, $R^5$, $R^6$ and $R^7$ being either a chlorine atom or a fluorine atom; $R^4$ being a hydrogen atom (—H) in $R^2$ when $R^3$ is either aryl or aralkyl; and
A is either carbonyl (=C=O) or methylene (—CH$_2$—)

(Throughout the disclosure "aryl" is defined by Formula II and "aralkyl" is defined by Formula III unless otherwise specified.)

Compounds I are prepared according to the following reaction scheme:

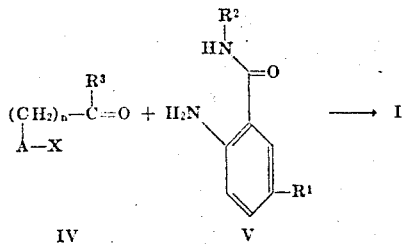

wherein
X is either hydroxy (—OH) or a halogen atom, e.g. a chlorine atom (—Cl) and a bromine atom (—Br); and
$n$ is either 2 (preparation of compounds Ia), 3 (preparation of compounds Ib) or 4 (preparation of compounds Ic).

(Each of $R^1$, $R^2$, $R^3$, $R^4$, $R^5$, $R^6$, $R^7$, A, X and $n$ has its above-ascribed meaning throughout the instant text in the absence of an indication to the contrary.)

The above-noted reaction is effected in an inert solvent, e.g. o-dichlorobenzene, toluene and xylene, with heat, agitation and a catalytic amount of hydrogen ions. The catalytic hydrogen ion concentration is provided, e.g. by p-toluenesulfonic acid. The reaction takes place at reflux temperature. Reflux is continued until water removal is complete.

Compounds I are useful as antihypertensives. They may be administered either orally or parenterally in daily doses of from 50 milligrams to 100 milligrams.

Each of the pharmaceutically active compounds of this invention may be, e.g. incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g., talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD-30 and purified water. An exemplary tabletting formulation for the instant active compounds is:

| | Parts |
|---|---|
| Title compound of examples 2 | 33 |
| Tragacanth | 2 |
| Lactose | 56.5 |
| Corn starch | 5 |
| Talcum | 3 |
| Magnesium stearate | 0.5 |
| Alcohol SD-30, purified water, q.s. | |

Reactants IV and V are either known compounds or are prepared from known compounds by procedures well-known to the art-skilled.

The following examples illustrate the invention, all temperatures being in degrees centigrade, the parts and percentages being by weight unless otherwise specified, and the relationship between parts by weight and parts by volume being the same as that between the kilogram and the liter.

EXAMPLE 1

3a-phenyl-7-chloro-1,2,3,3a,4,5-hexahydro-pyrrolo[1,2-a]quinazoline-1,5-dione

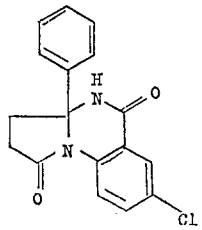

Place in a flask equipped with a stirrer and a device for separating water 10.7 parts (0.06 mole) of 3-benzoylpropionic acid, 13.6 parts (0.08 mole) of 5-chloroanthranilamide, 0.05 part of paratoluenesulfonic acid and 400 parts by volume of orthodichlorobenzene. Stir and reflux the obtained mixture until water removal is complete.

Remove the solvent (o-dichlorobenzene) on a rotary evaporator. Dissolve the resultant semisolid in hot isopropanol. Charcoal treat the i-propanol solution prior to refrigerating (8°) same.

Filter off the produced crystals (7.4 parts) of title compound, melting point (M.P.) 266°–267°.

Replacing the 5-chloroanthranilamide and the 3-benzoylpropionic acid with equivalent amounts of N-propylanthranilamide and 1-chloro-5-undecanone, respectively, results in the preparation of the corresponding quinazoline I. Likewise, replacement of the same reactants with equivalent amounts of 5-chloro-N-(3,4,5-trifluorophenyl)-anthranilamide and 3-acetopropionic acid, respectively, results in the preparation of the corresponding compound I.

EXAMPLE 2

3a-methyl-7-chloro-1,2,3,3a,4,5-hexahydro-pyrrolo[1,2-a]quinazoline-1,5-dione

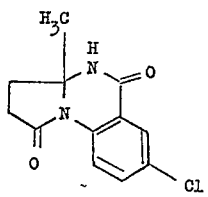

Place in a flask equipped with a stirrer and a device for separating water 11.6 parts (0.10 mole) of levulinic acid, 27.3 parts (0.16 mole) of 5-chloroanthranilanide, 0.5 parts of p-toluenesulfonic acid and 400 parts by volume of dichlorobenzene. Stir and reflux the obtained mixture until water removal is complete.

Remove the solvent (o-dichlorobenzene) on a rotary evaporator. Dissolve the resultant semisolid in hot isopropanol. Charcoal treat the i-propanol solution prior to refrigerating (8°) same.

Filter off the produced crystals (15.7 parts) of title compound, M.P. 222°–223°.

Replacing the 5-chloroanthranilamide and the levulinic acid with equivalent amounts of 5-methoxy-N-butylanthranilamide and 6-oxo-decanoyl chloride, respectively, results in the preparation of the corresponding quinazoline I. Likewise, replacement of the same reactants with equivalent amounts of 5-ethoxy-N-(3-ethyl-4-chloro-5-fluorobenzyl)-anthranilamide and 8-hydroxy-3-octanone, respectively, results in the preparation of the corresponding compound I.

EXAMPLE 3

3a-methyl-1,2,3,3a,4,5-hexahydro-pyrrolo[1,2-a]quinazolin-5-one

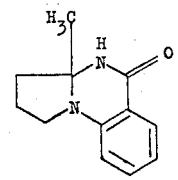

Place in a flask equipped with a stirrer and a device for separating water 6.8 parts (0.05 mole) of anthranilamide, 6.3 parts (0.06 mole) of 5-chloro-2-pentanone, 100 parts by volume of dichlorobenzene and 0.5 part by volume of p-toluenesulfonic acid. Stir and reflux the obtained mixture until water removal is complete.

Remove the solvent (o-dichlorobenzene) on a rotary evaporator. Dissolve the resultant semisolid in hot isopropanol. Charcoal treat the i-propanol solution prior to refrigerating (8°) same.

Filter off the produced crystals (7 parts) of title compound, M.P. 160°–162°.

Replacing the anthranilamide and the 5-chloro-2-pentanone with equivalent amounts of 5-propoxy-N-amylanthranilamide and 1-(3,4,5-trimethylbenzoyl)-4-bromobutane, respectively, results in the preparation of the corresponding quinazoline I. Likewise, replacement of the same reactants with equivalent amounts of 5-isopropoxy-N-(3-propylphenyl)-anthranilamide and 4-oxo-nonoyl bromide, respectively, results in the preparation of the corresponding compound I.

EXAMPLE 4

3a-p-fluorophenyl-1,2,3,3a,4,5-hexahydro-pyrrolo[1,2-a]quinazolin-5-one

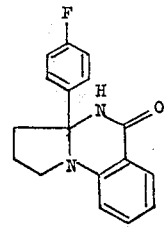

Place in a flask equipped with a stirrer and a device for separating water 13.6 parts (0.1 mole) of anthranilamide, 20.0 parts (0.1 mole) of 4'-chloro-4-fluorobutyrophenone, 0.3 parts p-toluenesulfonic acid and 200 parts by volume of o-dichlorobenzene. Stir and reflux the obtained mixture until water removal is complete.

Remove the solvent (o-dichlorobenzene) on a rotary evaporator. Dissolve the resultant semisolid in hot isopropanol. Charcoal treat the i-propanol solution prior to refrigerating (8°) same.

Filter off the produced crystals (11.3 parts) of title compound, M.P. 209°–211°.

Replacing the anthranilamide and the 4'-chloro-4-fluorobutyrophenone with equivalent amounts of 5-butoxy-N-hexylanthranilamide and 1-butyro-3-hydroxypropane, respectively, results in the preparation of the corresponding compound I. Likewise, replacement of the same reactants with equivalent amounts of anthranilamide and 3-phenacetylpropionic acid, respectively, results in the preparation of the corresponding compound I.

EXAMPLE 5

3a-p-anisyl-1,2,3,3a,4,5-hexahydro-pyrrolo[1,2-a]quinazolin-5-one

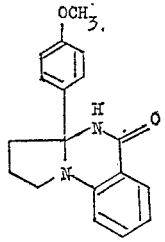

Place in a flask equipped with a stirrer and a device for separating water 10.7 parts (0.05 mole) of 4'-chloro-4-methoxybutyrophenone, 8.2 parts (0.06 mole) of anthranilamide, 0.3 part of p-toluenesulfonic acid and 150 parts by volume of o-dichlorobenzene. Stir and reflux the obtained mixture until water removal is complete.

Remove the solvent (o-dichlorobenzene) on a rotary evaporator. Dissolve the resultant semisolid in hot isopropanol. Charcoal treat the i-propanol solution prior to refrigerating (8°) same.

Filter off the produced crystals (15.1 parts) of title compound, M.P. 225°–227°.

Replacing the anthranilamide and the 4'-chloro-4-methoxybutyrophenone with equivalent amounts of 5-trifluoromethyl-N-(3,5-dichlorobenzyl) - anthranilamide and 4-acetobutyl chloride, respectively, results in the preparation of the corresponding quinazolinone I.

EXAMPLE 6

3a-(2,4-dimethylphenyl)-1,2,3,3a,4,5-hexahydro-pyrrolo[1,2-a]quinazolin-5-one

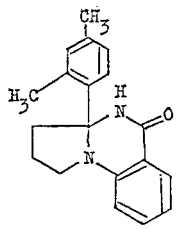

Place in a flask equipped with a stirrer and a device for separating water 13.6 parts (0.1 mole) of anthranilamide, 21.1 parts (0.1 mole) of 4'-chloro-2,4-dimethylbutyrophenone, 1.0 part p-toluenesulfonic acid and 250 parts by volume of o-dichlorobenzene. Stir and reflux the obtained mixture until water removal is complete.

Remove the solvent (o-dichlorobenzene) on a rotary evaporator. Dissolve the resultant semisolid in hot isopropanol. Charcoal treat the i-propanol solution prior to refrigerating (8°) same.

Filter off the produced crystals of title compound.

Replacing the anthranilamide and the 4'-chloro-2,4-N-dimethylbutyrophenone with equivalent amounts of 5-methyl-N-allylanthranilamide and 6-oxo-dodecanoyl chloride, respectively, results in the preparation of the corresponding quinazolinine I. Likewise, replacement of the same reactants with equivalent amounts of 5-ethyl-N-(3,4-dimethyl-4-butylphenyl)-anthranilamide and 1-isobutyro-5-hydroxypentane, respectively, results in the preparation of the corresponding compound I.

EXAMPLE 7

3a-phenyl-1,2,3,3a,4,5-hexahydro-pyrrolo[1,2-a]quinazoline-1,5-dione

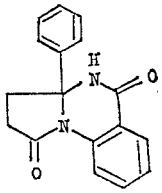

Place in a flask equipped with a stirrer and a device for separating water 5.44 parts (0.04 mole) of anthranilamide, 5.34 parts (0.03 mole) 3-benzoylpropionic acid, 0.3 part p-toluenesulfonic acid and 100 parts by volume of o-dichlorobenzene. Stir and reflux the obtained mixture until water removal is complete.

Remove the solvent (o-dichlorobenzene) on a rotary evaporator. Dissolve the resultant semisolid in hot isopropanol. Charcoal treat the i-propanol solution prior to refrigerating (8°) same.

Filter off the produced crystals (6.1 parts) of title compound.

Replacing the anthranilamide and the 3-benzoylpropionic acid with equivalent amounts of 5-propylanthranilamide and 4-propionylbutyryl bromide, respectively, results in the preparation of the corresponding quinazolinone I. Likewise, replacement of the same reactants with equivalent amounts of 5-isopropyl-N-(3-chloro-5-ethoxybenzyl)-anthranilamide and 4'-bromo-2-chloro-5-ethoxybutyrophenone, respectively, results in the preparation of the corresponding compound I.

EXAMPLE 8

3a-methyl-1,2,3,3a,4,5-hexahydro-pyrrolo[1,2-a]quinazoline-1,5-dione

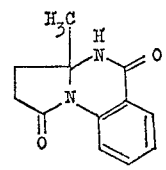

Place in a flask equipped with a stirrer and a device for separating water 10.88 parts (0.08 mole) of anthranilamide, 5.80 parts (0.05 mole of levulinic acid, 0.3 part-p-toluenesulfonic acid and 100 parts by volume of o-dichlorobenzene. Stir and reflux the obtained mixture until water removal is complete.

Remove the solvent (o-dichlorobenzene) on a rotary evaporator. Dissolve the resultant semisolid in hot isopropanol. Charcoal treat the i-propanol solution prior to refrigerating (8°) same.

Filter off the produced crystals (5.1 parts) of title compound, M.P. 179°–180°.

Replacing the anthranilamide and the levulinic acid with equivalent amounts of 5-butyl-N-methylanthranilamide and 4-oxo-octanol, respectively, results in the preparation of the corresponding quinazolinone I. Likewise, replacement of the same reactants with equivalent amounts of 5-amyl-N-(3,4-dipropoxy-5-methylphenyl) - anthranilamide and 4-butyrobutyryl chloride, respectively, results in the preparation of the corresponding compound I.

EXAMPLE 9

3a-methyl-4-phenyl-1,2,3,3a,4,5-hexahydro-pyrrolo[1,2-a] quinazoline-1,5-dione

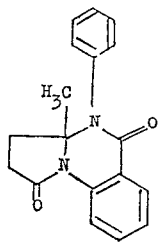

Place in a flask equipped with a stirrer and a device for separating water 10.6 parts (0.05 mole) of N-phenyl-anthranilamide, 9.3 parts (0.08 mole) of levulinic acid, 0.2 part p-toluenesulfonic acid and 200 parts by volume of o-dichlorobenzene. Stir and reflux the obtained mixture until water removal is complete.

Remove the solvent (o-dichlorobenzene) on a rotary evaporator. Dissolve the resultant semisolid in hot isopropanol. Charcoal treat the i-propanol solution prior to refrigerating (8°) same.

Filter off the produced crystals (8.3 parts) of the title compound, M.P. 225°–225.5.

Replacing the N-phenylanthranilamide and the levulinic acid with equavalent amounts of 5-hexyl-N-ethylanthranilamide and 7-chloro-2-heptanone, respectively, results in the preparation of the corresponding quinazolinone I.

EXAMPLE 10

4a-methyl-1,2,3,4,5,6-hexahydro-4aH-pyrido[1,2-a]quinazoline-1,6-dione

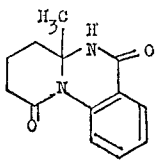

Place in a flask equipped with a stirrer and a device for separating water 6.8 parts (0.05 mole) of anthranilamide, 7.8 parts (0.06 mole) of 5-oxohexanoic acid, 0.5 parts p-toluenesulfonic acid and 100 parts by volume of dichlorobenzene. Stir and reflux the obtained mixture until water removal is complete.

Remove the solvent (o-dichlorobenzene) on a rotary evaporator. Dissolve the resultant semisolid in hot isopropanol. Charcoal treat the i-propanol solution prior to refrigerating (8°) same.

Filter off the produced crystals (3.1 parts) of the title compound, M.P. 205°–206°.

Replacing the anthranilamide and the 5-oxohexanoic acid with equivalent amounts of N-(4-butoxybenzyl)-anthranilamide and 6-oxo-undecanoic acid, respectively, results in the preparation of the corresponding quinazolinone I.

EXAMPLE 11

4a-phenyl-1,2,3,4,5,6-hexahydro-4aH-pyrido[1,2-a]quinazoline-1,6-dione

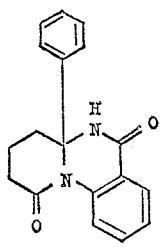

Place in a flask equipped with a stirrer and a device for separating water 6.8 parts (0.05 mole) of anthranilamide, 7.7 parts (0.04 mole) of 4-benzoylbutyric acid, 0.5 part of p-toluenesulfonic acid and 100 parts by volume of o-dichlorobenzene. Stir and reflux the obtained mixture until removal is complete.

Remove the solvent (o-dichlorobenzene) on a rotary evaporator. Dissolve the resultant semisolid in hot isopropanol. Charcoal treat the i-propanol solution prior to refrigerating (8°) same.

Filter off the produced crystals (7.1 parts) of the title compound, M.P. 242° to 243°.

Replacing the anthranilamide and the 4-benzoylbutyric acid with equivalent amounts of 5-chloro-N-propylanthranilamide and 6-methyl-5-oxoheptanoyl bromide, respectively, results in the preparation of the corresponding quinazolinone I.

EXAMPLE 12

3a-(3,4-dimethylphenyl)-1,2,3,3a,4,5-hexahydro-pyrrolo[1,2-a]quinazolin-5-one

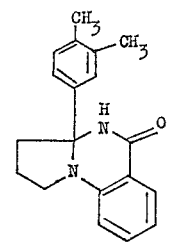

Place in a flask equipped with a stirrer and a device for separating water 9.5 parts (0.07 mole) of anthranilamide 10.6 parts (0.05 mole) of 4'-chloro-3,4-dimethyl-butyrophenone, 0.5 parts of p-toluenesulfonic acid and 200 parts by volume of dichlorobenzene. Stir and reflux the obtained mixture until water removal is complete.

Remove the solvent (o-dichlorobenzene) on a rotary evaporator. Dissolve the resultant semisolid in hot isopropanol. Charcoal treat the i-propanol solution prior to refrigerating (8°) same.

Filter off the produced crystals of the title compound, M.P. 225°–227°.

Replacing the anthranilamide and the 4'-chloro-3,4-dimethylbutyrophenone with equivalent amounts of 5-methoxy - N - (3 - methoxy - 4-chloro-5-fluoro-phenyl)-anthranilamide and 1 - (2,4-dichloro-3,5-dimethylbenzoyl) - 3 - bromopropane, respectively, results in the preparation of the corresponding quinazolinone I.

It is though that the invention will be understood from the foregoing description. References to compounds I include quinazolines Ia, Ib, and Ic unless otherwise limited. From the depicted structures it is seen that the carbon atom to which substituent $R^3$ is bonded is asymmetric. The individual isomers thus exist as enantiomers. Racemic mixtures are resolvable into their optically active components by methods of resolution well-known to the art-skilled. Both the racemic mixtures and the optically active antipodes are encompassed by this invention.

Various changes may be made in the structures of compounds I without departing from the spirit or scope of the invention or sacrificing its material advantages. The examples merely provide illustrative embodiments.

What is claimed is:

1. A compound of the formula

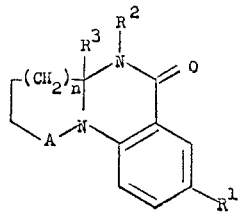

wherein n represents 0 or 1;
A represents carbonyl or methylene;
$R^1$ represents hydrogen or chloro;
$R^2$ represents hydrogen or phenyl; and
$R^3$ represents lower alkyl, phenyl, p-fluorophenyl, p-chlorophenyl, p-straight chain(lower)alkoxyphenyl or 3,4-di(lower)straight chain alkyl phenyl.

2. 3a-phenyl - 7 - chloro-1,2,3,3a,4,5-hexahydro-pyrrolo-[1,2-a]quinazoline-1,5-dione.

3. 3a-methyl - 7 - chloro - 1,2,3,3a,4,5-hexahydro-pyrrolo-[1,2-a]quinazoline-1,5-dione.

4. 3a-phenyl - 1,2,3,3a,4,5 - hexahydro-pyrrolo[1,2-a]-quinazoline-1,5-dione.

5. 3a-methyl - 1,2,3,3a,4,5 - hexahydro-pyrrolo[1,2-a]-quinazoline-1,5-dione.

6. 3a-methyl - 4 phenyl - 1,2,3,3a,4,5-hexahydro-pyrrolo-[1,2-a]quinazoline-1,5-dione.

7. 3a-p-fluorophenyl - 1,2,3,3a,4,5 - hexahydro-pyrrolo-[1,2-a]-quinazolin-5-one.

8. 3a - p - anisyl - 1,2,3,3a,4,5-hexahydro-pyrrolo-[1,2-a]-quinazolin-5-one. [

9. 3a-(3,4 - dimethylphenyl) - 1,2,3,3a,4,5 - hexahydro-pyrrolo-[1,2-a]quinazolin-5-one.

10. 4a - methyl - 1,2,3,4,5,6 - hexahydro - 4aH-pyrido [1,2-a]-quinazoline-1,6-dione.

References Cited

Wertheim, Textbook of Organic Chemistry, pages 763–764.

ALEX MAZEL, *Primary Examiner.*

R. V. RUSH, *Assistant Examiner.*

U.S. Cl. X.R.

424—251